United States Patent
Pravettone

(10) Patent No.: US 7,070,234 B1
(45) Date of Patent: Jul. 4, 2006

(54) MOTORCYCLE BACKREST ADJUSTING SYSTEM

(76) Inventor: Gaetano Pravettone, 15834 Camden Ave., East Pointe, MI (US) 48021

( * ) Notice: Subject to any disclaimer, the term of this patent is extended or adjusted under 35 U.S.C. 154(b) by 0 days.

(21) Appl. No.: 11/124,566

(22) Filed: May 9, 2005

(51) Int. Cl.
*B62J 1/00* (2006.01)
*B60N 2/22* (2006.01)

(52) U.S. Cl. ............................ 297/215.12; 297/362.12; 297/383

(58) Field of Classification Search ............ 297/215.11, 297/215.12, 195.1, 378.1, 362.1, 362.12, 297/362.13, 383
See application file for complete search history.

(56) References Cited

U.S. PATENT DOCUMENTS

| 3,822,917 A |   | 7/1974  | George |
|---|---|---|---|
| 4,030,750 A | * | 6/1977  | Abram ........................ 297/375 |
| 4,466,660 A | * | 8/1984  | Mabie .................... 297/215.11 |
| 4,563,038 A |   | 1/1986  | Hirose |
| 4,776,632 A | * | 10/1988 | Akimori et al. .......... 297/284.9 |
| D301,409 S  |   | 6/1989  | Beckett |
| 5,026,119 A | * | 6/1991  | Frank et al. ................. 297/383 |
| 5,544,937 A | * | 8/1996  | Hanagan ................. 297/215.12 |
| 5,775,776 A | * | 7/1998  | Schooler et al. ............. 297/375 |
| 6,007,150 A | * | 12/1999 | Clerkin et al. .......... 297/215.12 |
| 6,491,124 B1 |  | 12/2002 | Thompson et al. |

FOREIGN PATENT DOCUMENTS

JP         03213480 A    *    9/1991

* cited by examiner

*Primary Examiner*—Peter M. Cuomo
*Assistant Examiner*—Joe Edell

(57) ABSTRACT

A motorcycle backrest adjusting system includes a motorcycle that has a seat and a pair of support bars that extend rearward from the seat. A pair of lower brackets is provided and each of the lower brackets is attached to one of the support bars. A pair of upper brackets is provided and each of the upper brackets is moveably coupled to one of the lower brackets. Each of a pair of guide tracks is attached to and extends along one of the upper brackets. A drive apparatus selectively moves the upper brackets with respect to the lower brackets. A control is operationally coupled to the drive apparatus. A backrest is mounted to the upper brackets and faces toward a pair of handlebars of the motorcycle. The backrest is selectively moved toward or away from the seat.

5 Claims, 3 Drawing Sheets

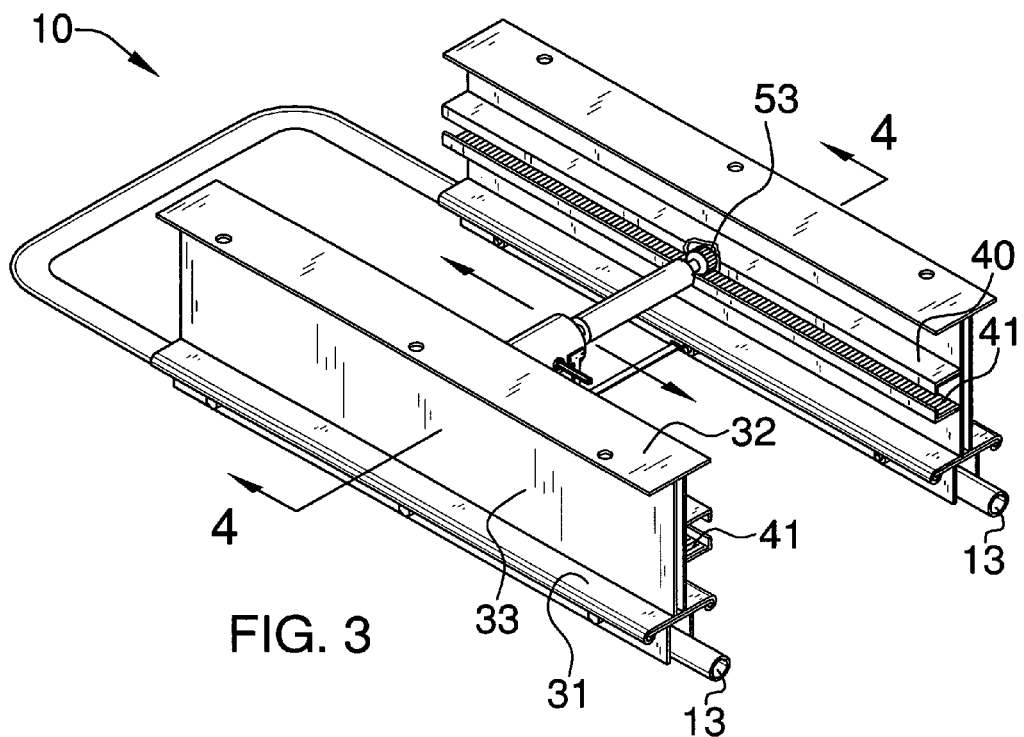
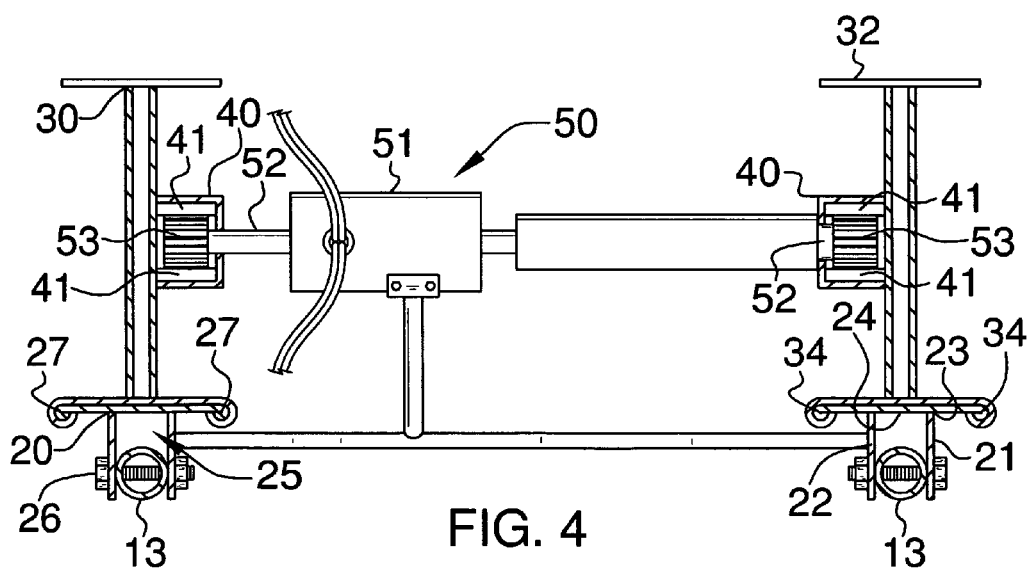

MOTORCYCLE BACKREST ADJUSTING SYSTEM

BACKGROUND OF THE INVENTION

1. Field of the Invention

The present invention relates to seat adjusting devices and more particularly pertains to a new seat adjusting device for selectively moving the backrest of a motorcycle either forward or rearward of a seat of the motorcycle.

2. Description of the Prior Art

The use of seat adjusting devices is known in the prior art. U.S. Pat. No. 6,007,150 describes a seat assembly for a motorcycle that includes an adjustable backrest. Another type of seat adjusting device is U.S. Pat. No. 3,822,917 which includes a backrest for a motorcycle that may be selectively tilted with respect to a horizontal plane or may be moved back or forth with respect to a seat. Yet another such device is found in U.S. Pat. No. 6,491,124 which has a structure adapted for mounting on a snowmobile.

While these devices fulfill their respective, particular objectives and requirements, the need remains for a device which is mountable on a motorcycle and supports a backrest in an automated manner such that a person can selectively move the backrest by an electronic control. This will allow a person to easily position the backrest in a location that is comfortable for a rider.

SUMMARY OF THE INVENTION

The present invention meets the needs presented above by generally comprising a motorcycle that has a seat and a pair of support bars that are attached to the motorcycle and extend rearward from the seat. The support bars are orientated parallel to each other and are substantially horizontally orientated. A pair of lower brackets is provided and each of the lower brackets is attached to one of the support bars. A pair of upper brackets is provided and each of the upper brackets is moveably coupled to one of the lower brackets. A pair of guide tracks is also provided. Each of the guide tracks is attached to and extends along a length of one of the upper brackets. A drive apparatus is fixedly attached to the lower brackets. The drive apparatus is mechanically coupled to the guide tracks and selectively moves the upper brackets with respect to the lower brackets. A control is operationally coupled to the drive apparatus to selectively turn the drive apparatus on a first direction or in a second direction. A backrest is mounted to the upper brackets and faces toward a pair of handlebars of the motorcycle. The backrest is selectively moved toward or away from the seat.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the present invention.

FIG. 4 is a cross-sectional view taken along line 4—4 of FIG. 3 of the present invention.

DESCRIPTION OF THE PREFERRED EMBODIMENT

Figure 1:
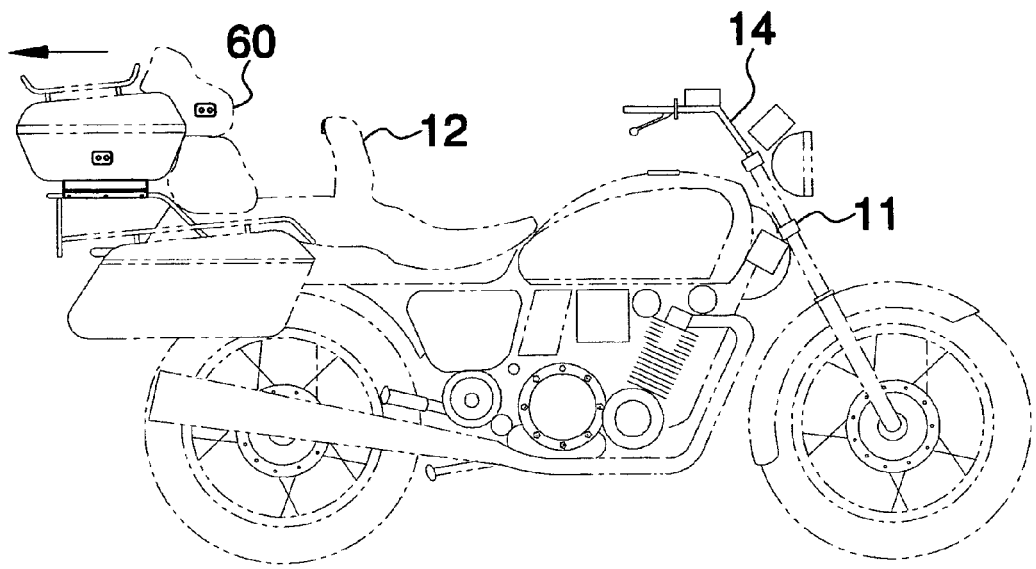
FIG. 1 is a side in-use view of a motorcycle backrest adjusting system according to the present invention.
Figure 2:
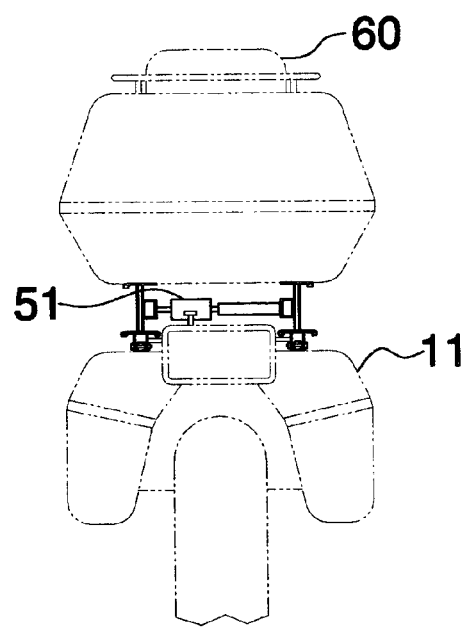
FIG. 2 is a rear in-use view of the present invention.
Figure 5:
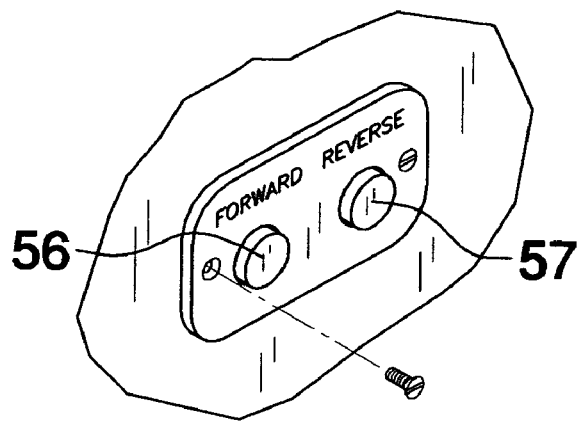
FIG. 5 is a perspective view of a control of the present invention.
Figure 6:
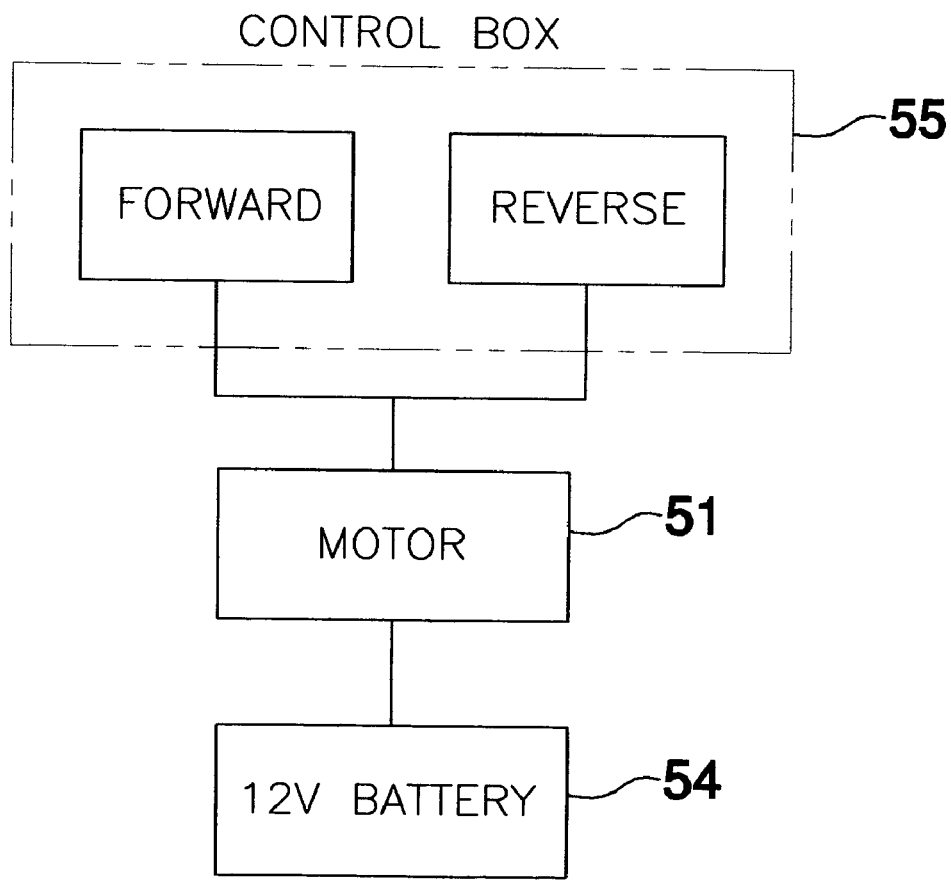
FIG. 6 is a schematic view of the present invention.

With reference now to the drawings, and in particular to FIGS. 1 through 6 thereof, a new seat adjusting device embodying the principles and concepts of the present invention and generally designated by the reference numeral 10 will be described.

As best illustrated in FIGS. 1 through 6, the motorcycle backrest adjusting system 10 generally comprises a motorcycle 11 that has a seat 12. A pair of support bars 13 is attached to the motorcycle 11 and extends rearward from the seat 12. The support bars 13 are orientated parallel to each other and are substantially horizontally orientated.

A pair of lower brackets 20 is provided. Each of the lower brackets 20 is attached to one of the support bars 13. Each of the lower brackets 20 is elongated and extends away from the seat 12. The lower brackets 20 each include a first vertical panel 21 and second vertical panel 22 each having an upper edge 23 and an upper panel 24 attached to and extending along each of the upper edges 23. A slot 25 is defined between respective ones of the first 21 and second 22 vertical panels. The support bars 13 are positioned in one of the slots 25. Each of a plurality of fasteners 26 extends through one of the support bars 13 and adjacent ones of the first 21 and second 22 vertical panels. The upper panels 24 each have a pair of outer edges 27 extending outwardly away from the first 21 and second 22 vertical panels.

A pair of upper brackets 30 is provided and each of the upper brackets 30 is moveably coupled to one of the lower brackets 20. The upper brackets 30 each include a lower plate 31, and upper plate 32 and a vertical plate 33 that is attached to and extends between the lower 31 and upper 32 plates. Each of the upper 32 and lower 31 plates is horizontally orientated. The lower plates 31 have a pair of lateral edges 34. Each of the lateral edges 34 is moveably coupled to one of the outer edges 27.

Also provided is a pair of guide tracks 40. Each of the guide tracks 40 is attached to and extends along a length of one of the upper brackets 30. Each of the guide tracks 40 has a horizontally orientate longitudinal axis. The guide tracks 40 are is positioned on an inner surface of the vertical plates 33 so that the guide tracks 40 face each other. The guide tracks 40 each have a plurality of gear engaging teeth 41 therein that are positioned along a length of each of the guide tracks 40. The teeth 41 are elongated along lines orientated perpendicular to the longitudinal axis of the guide tracks 40.

A drive apparatus 50 is fixedly attached to the lower brackets 20 and is mechanically coupled to the guide tracks 40 so that the drive apparatus 50 may selectively move the upper brackets 40 with respect to the lower brackets 30. The drive apparatus 50 includes a motor 51 and a pair of drive shafts 52 each being mechanically coupled to the motor 51. The motor 51 selectively rotates each of the drive shafts 52 in a first direction or a second direction. The drive shafts 52 each have an end that has a gear wheel 53 mounted thereon. Each of the gear wheels 53 is mounted in one of the guide tracks 40 and each being in communication with a corresponding set of the teeth 41. The motor 51 is electrically coupled to a power supply 54, which is preferably a battery of the motorcycle 11.

A control 55 is operationally coupled to the motor 51 to selectively turn the motor 51 on in the first direction or in the second direction. The control 55 preferably includes a forward button 56 and a reverse button 57. The control 55 may be attached to the motorcycle 11 and positioned as desired.

A backrest 60 is mounted to the upper brackets 30 with conventional fasteners extending through the upper plates and faces toward a pair of handlebars 14 of the motorcycle 11. This allows the backrest 60 to be selectively positioned adjacent to the seat 12, or spaced therefrom, or, depending on the configuration used, extended over seat. This last option is particularly useful if the seat 12 includes both front and rear sections.

In use, the backrest 60 may be selectively moved toward or away from the seat 12 by way of the control 55. This allows riders to vary the depth between the backrest 60 and the seat 12 for comfort depending on the size of the rider.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An automatic motorcycle backrest adjustment assembly, said assembly comprising:

a motorcycle having a seat, a pair of support bars being attached to said motorcycle and extending rearward from said seat, said support bars being orientated parallel to each other and being substantially horizontally orientated;

a pair of lower brackets, each of said lower brackets being attached to one of said support bars, each of said lower brackets including a first vertical panel and second vertical panel each having an upper edge and an upper panel attached to and extending along each of said upper edges, a slot being defined between respective ones of said first and second vertical panels, each of said support bars being positioned in one of said slots, each of a plurality of fasteners extending through one of said support bars and adjacent ones of said first and second vertical panels;

a pair of upper brackets, each of said upper brackets being moveably coupled to one of said lower brackets;

a pair of guide tracks, each of said guide tracks being attached to and extending along a length of one of said upper brackets;

a drive apparatus being fixedly attached to said lower brackets, said drive apparatus being mechanically coupled to said guide tracks, said drive apparatus selectively moving said upper brackets with respect to said lower brackets;

a control being operationally coupled to said drive apparatus to selectively turn said drive apparatus in a first direction or in a second direction;

a backrest being mounted to said upper brackets at a fixed angle and facing toward a pair of handlebars of the motorcycle; and wherein said upper brackets and said backrest may be selectively moved toward or away from said seat.

2. The assembly according to claim 1, wherein each of said upper panels has a pair of outer edges extending outwardly away from said first and second vertical panels, each of said upper brackets including a lower plate, and upper plate and a vertical plate being attached to and extending between said lower and upper plates, each of said upper and lower plates being horizontally orientated, said lower plates having a pair of lateral edges, each of said lateral edges being moveably coupled to one of said outer edges.

3. The assembly according to claim 1, wherein each of said guide tracks face each other, each of said guide tracks having a plurality of gear engaging teeth therein and being positioned along a length of each of said guide tracks, said drive apparatus including a motor and a pair of drive shafts being mechanically coupled to said motor, said motor selectively rotating each of said drive shafts in a first direction or a second direction, each of said drive shafts having an end having a gear wheel mounted thereon, each of said gear wheels being mounted in one of said guide tracks and being in communication with a corresponding set of said teeth.

4. An automatic motorcycle backrest adjustment assembly, said assembly comprising:

a motorcycle having a seat, a pair of support bars being attached to said motorcycle and extending rearward from said seat, said support bars being orientated parallel to each other and being substantially horizontally orientated;

a pair of lower brackets, each of said lower brackets being attached to one of said support bars, each of said lower brackets being elongated and extending away from said seat, each of said lower brackets including a first vertical panel and second vertical panel each having an upper edge and an upper panel attached to and extending along each of said upper edges, a slot being defined between respective ones of said first and second vertical panels, each of said support bars being positioned in one of said slots, each of a plurality of fasteners extending through one of said support bars and adjacent ones of said first and second vertical panels, each of said upper panels having a pair of outer edges extending outwardly away from said first and second vertical panels;

a pair of upper brackets, each of said upper brackets being moveably coupled to one of said lower brackets, each of said upper brackets including a lower plate, and upper plate and a vertical plate being attached to and extending between said lower and upper plates, each of said upper and lower plates being horizontally orientated, said lower plates having a pair of lateral edges, each of said lateral edges being moveably coupled to one of said outer edges;

a pair of guide tracks, each of said guide tracks being attached to and extending along a length of one of said upper brackets, each of said guide tracks having a horizontally orientate longitudinal axis, each of said guide tracks being positioned on an inner surface of said vertical plates such that said guide tracks face each other, each of said guide tracks having a plurality of gear engaging teeth therein and being positioned along a length of each of said guide tracks;

a drive apparatus being fixedly attached to said lower brackets, said drive apparatus being mechanically coupled to said guide tracks, said drive apparatus selectively moving said upper brackets with respect to said lower brackets, said drive apparatus including a motor and a pair of drive shafts being mechanically coupled to said motor, said motor selectively rotating each of said drive shafts in a first direction or a second direction, each of said drive shafts having an end having a gear wheel mounted thereon, each of said gear wheels being mounted in one of said guide tracks and being in communication with a corresponding set of said teeth;

a control being operationally coupled to said motor to selectively turn said motor in said first direction or in said second direction;

a backrest being mounted to said upper brackets at a fixed angle and facing toward a pair of handlebars of the motorcycle; and wherein said upper brackets and said backrest may be selectively moved toward or away from said seat.

5. An automatic motorcycle backrest adjustment assembly, said assembly comprising:

a motorcycle having a seat, a pair of support bars being attached to said motorcycle and extending rearward from said seat, said support bars being orientated parallel to each other and being substantially horizontally orientated;

a pair of lower brackets, each of said lower brackets being attached to one of said support bars;

a pair of upper brackets, each of said upper brackets being moveably coupled to one of said lower brackets;

a pair of guide tracks, each of said guide tracks being attached to and extending along a length of one of said upper brackets, each of said guide tracks face each other, each of said guide tracks having a plurality of gear engaging teeth therein and being positioned along a length of each of said guide tracks;

a drive apparatus being fixedly attached to said lower brackets, said drive apparatus being mechanically coupled to said guide tracks, said drive apparatus selectively moving said upper brackets with respect to said lower brackets, said drive apparatus including a motor and a pair of drive shafts being mechanically coupled to said motor, said motor selectively rotating each of said drive shafts in a first direction or a second direction, each of said drive shafts having an end having a gear wheel mounted thereon, each of said gear wheels being mounted in one of said guide tracks and being in communication with a corresponding set of said teeth;

a control being operationally coupled to said drive apparatus to selectively turn said drive apparatus in a first direction or in a second direction;

a backrest being mounted to said upper brackets at a fixed angle and facing toward a pair of handlebars of the motorcycle; and wherein said upper brackets and said backrest may be selectively moved toward or away from said seat.

* * * * *